United States Patent [19]

Domszy et al.

[11] Patent Number: 5,132,390
[45] Date of Patent: Jul. 21, 1992

[54] LOW MELTING, SOLUBLE, LIQUID CRYSTALLINE POLYESTERS

[75] Inventors: Roman C. Domszy, Lancaster; Paul J. Shannon, Exton, both of Pa.

[73] Assignee: Armstrong World Industries, Inc., Lancaster, Pa.

[21] Appl. No.: 699,480

[22] Filed: May 13, 1991

[51] Int. Cl.$^5$ .............. C08G 63/02; C08G 63/133; C08G 63/42; C08G 63/66
[52] U.S. Cl. .................. 528/176; 564/153; 564/158; 514/616; 252/299.01; 522/164; 522/174; 526/284; 528/219
[58] Field of Search .............. 528/176; 564/153, 158; 514/616; 252/299.01; 522/164, 174; 526/284

[56] References Cited

U.S. PATENT DOCUMENTS 5,030,703  7/1991  Pielartzik et al. .................. 528/176
5,066,767 11/1991  Motzner et al. .................... 528/176

Primary Examiner—John Kight, III
Assistant Examiner—Duc Truong

[57] ABSTRACT

The present invention is directed to liquid cyrstalline polyesters which are soluble and have low melting points. Preferably the solubility in halogenated solvent is greater than 10 wt. % and the crystalline melting point is less than 125° C. The polyesters are thermotropic and nematic, and preferably have a number average molecular weight from 1,000 to 25,000. The polyesters include a cyclohexane ring in the backbone and are more particularly main-chain thermotropic polyester which contain trans-1,4 cyclohexane dicarboxylate mesogens and flexible spacer groups. These compositions are useful in coating applications including floor coverings.

7 Claims, No Drawings

LOW MELTING, SOLUBLE, LIQUID CRYSTALLINE POLYESTERS

FIELD OF THE INVENTION

The present invention is directed to liquid crystalline polyesters which are soluble and have low melting points. Preferably the solubility in halogenated solvent is greater than 10 wt. % and the crystalline melting point is less than 125° C. The polyesters are thermotropic and nematic, and preferably have a number average molecular weight from 1,000 to 25,000, and more preferably from 1,000 to 10,000. In particular the polyesters are main-chain thermotropic polyesters which contain trans-1,4-cyclohexane dicarboxylate mesogens and flexible spacer groups. These compositions are useful in coating applications including floor coverings.

BACKGROUND OF THE INVENTION

The term liquid crystal or mesogen refers to states of matter which lies between solid crystals and isotropic liquids. Liquid crystalline materials possess some structural characteristics of crystals yet may be viscous or mobile liquids.

The varying degrees of order which are possessed by liquid crystals can be classified into two general types of structures called mesophases. A liquid crystal, when heated from the crystalline state may initially lose one dimension of its positional order to form a smectic mesophase. The smectic phase retains the orientational order of the crystalline state.

Further heating may result in the formation of a nematic mesophase. In this phase, the positional order is lost and the material retains only the one-directional crystalline state. These mesophases can be exhibited by both low molecular weight compounds and by polymers with mesogenic groups.

There are two main classes of thermotropic polymers. The mesogenic groups can incorporated into the backbone of the linear polymer or attached as sidegroups. For main-chain thermotropic polymers, such as those described in the present invention, the polymeric and mesogenic properties are closely coupled since the polymer molecule adopts a conformation and packing which is compatible with the structure of the particular mesophase. In this case alteration of the repeating unit will affect the molecular packing and cause the properties of the mesophase to depart from those of the low-molecular weight mesogen. The mesogen may also strongly affect the mechanical properties of the solid polymer cooled from the mesophase.

Generally speaking, the development of a melt processible polymer liquid crystalline coating system requires materials with low melting points. Several approaches have been used to lower the melting points of thermotropic polyesters to enable them to be melt processed without decomposition. These methods include the use of flexible spacers, lateral substituents within the mesogen, bent and crankshaft monomers and copolymerization.

Most of these liquid crystalline polyesters can only be effectively produced by melt polymerization owing to their low solubility characteristics. Nevertheless, melting points ranging from 100° to 300° C. have been achieved with these approaches. For example, R. W. Lenz, *J. Polym. Sci.*, Polymer Symposium 72, pp. 1–8, (1985), describes a series of polyesters based on a triad of 1,4-phenylene units linked by ester bonds and having an oxyethylene spacer unit. With sufficient number of oxyethylene units, a melting point as low as 102° C. was obtained using a polydisperse oxyethylene spacer. These polyesters generally display broad smectic mesophases and have low solubility in common organic solvents at ambient temperatures.

A homologous series of thermotropic polyesters based on 4,4'-dihydroxy-2,2'-dimethylazoxybenzene and alkanedioic acids were reported in Blumstein, A. and Thomas, O., *Macromolecules*, 1982, Vol. 15, No. 5, pp. 1264–7. These polyesters were disclosed to have moderate transition temperatures and to be soluble.

In low molecular weight liquid crystals, cyclohexyl moieties have been used to replace aromatic rings in mesogens to both lower the crystal melting point and increase the breadth of the nematic phase. See G. Gray, *Polymer Liquid Crystals*, A. Ciferri, Ed., Academic Press, New York, 1982.

In polymers, cyclohexyl moieties also have been used in the formation of rigid main-chain polymers, block copolyesters, and semi-flexible polyesters containing mesogens and flexible spacers. See Schaefgen, U.S. Pat. No. 4,118,373; M. Polk, K. Bota, E. Akubiro, *Macromolecules*, Vol. 14, pp. 1626–9, (1981); D. Bruan and U. Schulke, *Makromol. Chem.*, Vol. 187, pp. 1145–50, (1986); and Kim Clausen et al., *Macromolecules*, Vol. 20, pp. 2660–4, (1988).

In semi-flexible polymers, trans-1,4-cyclohexanediol and trans-1,4-cyclohexane diacid have been used in mesogens together with methylene spacers to give polyesters with improved solubility and lower crystal melting points. See Clausen et al., supra. These polyesters have melt transitions generally lower than those of the corresponding fully aromatic triad polyesters. The lowest melting point was 144° C. with an isotropic transition of 205° C.

It is an object of the present invention to provide polyesters with low melting points, a broad nematic mesophase and high solubility characteristics.

A further object of the present invention is to provide processing and curing conditions that allow facile alignment of the polyesters and the subsequent formation of a three-dimensional polymer network.

Another object is to provide a thermotropic, nematic polyester having a cyclohexane ring in the backbone and a crystalline melting point of less than 125° C., preferably less than 100° C.

An additional object is to provide a thermotropic, nematic polyester having a cyclohexane ring in the backbone and which has a solubility in halogenated solvent greater than 10 wt. %, preferably greater than 20 wt. %, and more preferably at least 30 wt. %.

A further object is to provide a thermotropic, nematic polyester having a cyclohexane ring in the backbone and which has a nematic range of at least 20° C., preferably at least 40° C., and more preferably at least 60° C.

SUMMARY OF THE INVENTION

In accordance with the invention, the synthesis of new thermotropic homopolyesters and copolyesters with mesogenic cores utilizes a trans-1,4-cyclohexane diester of 4-hydroxybenzoate and various flexible spacers. These polyesters have low melting points and high solubility in halogenated solvents. They generally exhibit two distinct mesophases and their transitions are strongly molecular weight dependent.

According to the present invention there also is provided a new process to synthesize the component diols of polyesters. Further, there is provided a method for crosslinking the polyesters to from anisotropic coatings.

DETAILED DESCRIPTION OF THE INVENTION

First we describe the diphenols 1a-1f which may be used to practice this invention. Diphenols 1a-1f have the following structure:

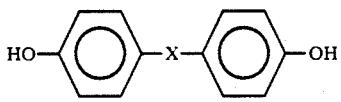

comprising two aromatic hydroxy moieties linked together by a flexible spacer group, X as listed in Table 1 below.

4-hydroxybenzoate gives rapid displacement of chloride to provide the diphenols 1a in good yield. In our experience, 4-hydroxybenzoate prepared in situ from 85% potassium hydroxide gives significantly higher reaction rates and better yields than when using anhydrous potassium 4-hydroxybenzoate in dry dimethylformamide.

We have found that condensation of diphenols 1a-1f with trans-1,4-cyclohexane dicarboxylic acid or diacid chloride produces polyesters with unusually low melting points and high solubility in certain organic solvents.

In one embodiment, the present invention includes specific polyesters derived from the condensation of trans-1,4-cyclohexane dicarbonyl chloride with diphenols 1a-1f as described in Scheme 1, below. The mesogenic group is formed during the polymerization reaction. The condensation of diphenols 1 with trans-1,4-cyclohexane diacid chloride was carried out in either

TABLE 1

| Spacer Group | X |
| --- | --- |
| 1a | $-C(O)-O-CH_2CH_2O-(CH_2CH_2O)_n-C(O)-$ |
| | (diester linkage based on ethylene glycol oligomers) |
| 1b | $-C(O)-O-CH_2Si(CH_3)_2O)_nSi(CH_3)_2-CH_2O-C(O)-$ |
| | (diester linkage from alkylsiloxane diol) |
| 1c | $-C(O)-O-CH_2-CH(CH_3)-O-(CH_2-CH(CH_3)-O)_n-C(O)-$ |
| | (diester linkage based on propylene glycol oligomers) |
| 1d | $-O-CH_2CH_2O-(CH_2CH_2O)_n-$ |
| | (diether linkage based on ethylene oxide oligomer) |
| 1e | $-O-CH_2Si(CH_3)_2O)_nSi(CH_3)_2-CH_2O-$ |
| | (diether linkage based on alkylsiloxane oligomer) |
| 1f | $-O-CH_2-CH(CH_3)-O-(CH_2-CH(CH_3)-O)_n-$ |
| | (diether linkage based on propylene glycol oligomers) | where n=1 to 6.

Two homologues (n=1,2) of the diphenol 1a, have previously been reported in Jedlinski, Z.; Franek, J.; Kuziw, P., *Makromol. Chem.*, 1986, Vol. 187, 2317. However, we disclose a very convenient alternative method to prepare the diphenol 1a that is noteworthy. Treatment of the bis-(chloroethyl) ethers derived from diethylene glycol and higher analogs with potassium pure tetrahydrofuran or 1:1 mixtures of pyridine/dichloroethane or pyridine/tetrahydrofuran solution. The ratio of diphenol to diacid chloride can be varied, preferably from about 1.5 to 1 (series 3) or from about 1 to 1.5 (series 4) to provide a series of molecular weight ranges. The polyesters of greatest molecular weight are prepared in pyridine/trichlorobenzene solvent with extended periods of heating.

SCHEME 1

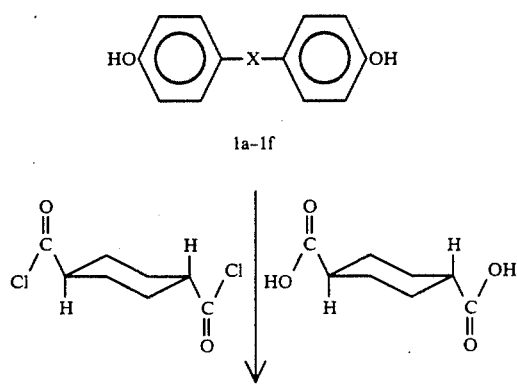

SCHEME 1

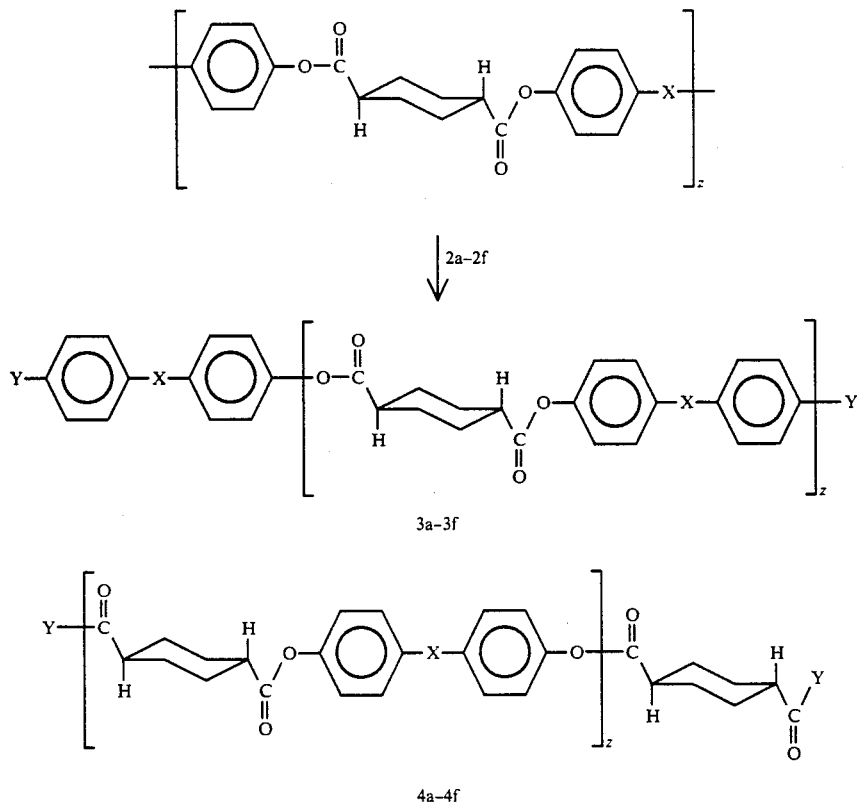

In a preferred second embodiment, the present invention encompasses polyesters derived form the condensation of trans-1,4-cyclohexane dicarbonyl chloride with diphenols 1a where n = 1 to 4. The ratio of trans-1,4-cyclohexane dicarbonyl chloride to the diphenols was controlled in order to produce a series of polyesters with preferred number average molecular weights (Mn) between 1,500–25,000.

In a third embodiment, the present invention encompasses copolyesters derived from the condensation of two or more diphenols 1a-1f with trans-1,4-cyclohexane diacid or diacid chloride.

In a fourth embodiment, the present invention encompasses polyesters, 3a-3f and 4a-4f, that have been modified by end-group capping with a suitable polymerizable moiety. Such a moiety could be, for instance, an acrylate ester, a methacrylate ester, an allyl group, a methacrylate derivative based upon the reaction of the phenol end groups with ethyl isocyanotomethacrylate, or a propylene oxide moiety. Thus, Y, the end group of polyester 3a-3f (Scheme 1), can independently equal:
HO—
$CH_2=CH—C(O)—O—$,
$CH_2=C(CH_3)—C(O)—O—$,
$CH_2=CH—CH_2—O—$,
$CH_2=C(CH_3)—C(O)—OCH_2CH_2N—C(O)—O—$, $CH_2\underset{O}{\overset{}{\diagdown\diagup}}CH—CH_2—O—$, or $O=C=N—R_1—N(H)—C(O)—O—$;

Y', the end group of polyester 4a-4f (Scheme 1), can independently equal:
HO—,
$CH_2=CH—CH_2—O—$, $CH_2\underset{O}{\overset{}{\diagdown\diagup}}CH—CH_2—O—$, $HO—R_1—O—$,
$NH_2—R_1—NR_2—$,
$R_2—C(=CH_2)—C(O)—O—R_1—O—$, or
Cl—;

$R_1$, the substituent in Y and Y', can equal: $C_2$ to $C_{20}$ alkyl, arylalkyl or cycloalkyl;

$R_2$, the substituent in Y', can equal H— or $C_1$ to $C_4$ alkyl; and z is 1 to 50, preferably 1 to 40, and more preferably 1 to 5.

In a fifth embodiment, the present invention encompasses polymer films derived from the curing of coating compositions comprising polyesters 3a-3f and 4a-4f. These polymer films may be isotropic, nematic, or twisted nematic in nature and may also have associated with it some degree of crystallinity. The introduction of a chiral unit into the flexible group of the polyester will induce the formation of a twisted nematic mesophase. Such mesophases can show unique optical properties such as the selective reflection of light.

The uniqueness of polyesters containing the trans-1,4-cyclohexane dicarboxylate mesogen is evident when the thermal properties and solubility of these polyesters is compared with polyesters comprised of more rigid diester mesogens such as 1,4-benzene dicarboxylates.

Polyester 2a (n=2) is denoted EO3/C indicating that there are three ethylene oxide spacers within the diphenol moiety. The corresponding polyester based upon 1,4 benzene dicarboxylic acid (terephthalic acid) is designated EO3/T. Polyester 2b (n=1) is denoted Si$_2$O/C. The polyester based on the condensation of trans-1,4-cyclohexanedicarbonyl chloride and 1,10-decamethylene bis(4-hydroxybenzoate) is denoted C10/C while that of terephthalic acid and decamethylene bis(4-hydroxybenzoate) is designated C10/T. The following Table 2 lists the polyester, melting points (Tm), isotropic points (Ti), points at which clearly defined nematic textures are observed (Tn), and solubilities in dichloromethane.

TABLE 2

| Polyester | Tm (°C.) | Tn (°C.) | Ti (°C.) | Solubility in CH$_2$Cl$_2$ |
|---|---|---|---|---|
| EO3/C | 122 | 135 | 187 | 30% |
| EO3/T | 195 | 220 | 283 | none |
| Si$_2$O/C | 155 | 170 | 210 | 30% |
| C10/C | 195 | Smectic | 210 | 1% |
| C10/T | 221 | Smectic | 267 | none |

The incorporation of the trans-1,4-cyclohexane moiety into the mesogenic unit can result in enhanced solubility and lower melting points when the polyester contains oxyethylene or siloxane flexible spacers.

We recognize that the liquid crystalline polyesters derived from diphenol 1a and trans-1,4-cyclohexane dicarboxylic acid or acid chloride have unique properties including low melting points, high solubilities in organic solvents, and low melt viscosities, all of which make them especially amenable to the preparation of curable liquid crystalline polyester coating systems.

The preferred polyesters 2a are based on the condensation of diphenol 1a (n=1) and 1a (n=2) with trans-1,4-cyclohexane dicarboxylic acid or acid chloride. The preferred polyesters all have low melting points, and have broad nematic mesophase temperature ranges. Also, preferred are copolyesters 2a which have more than one spacer unit with n=1 and 2. The copolyesters have especially low melting points and broad nematic mesophases. To practice this invention for coating applications, the molecular weight of the polyester is controlled during polymerization so as to provide sufficient number of end-groups that can be capped with a reactive moiety. The type of end group formed in the initial polymerization depends on the ratio of the reactants.

Condensation can occur with excess diphenol to give phenol capped polyesters 3 (Y=OH) or with excess acid chloride to give acid chloride capped polyesters 4 (Y=Cl). The phenol terminated polyesters can be capped by treatment of the polyester in a suitable solvent base such as triethylamine with acryloyl chloride or methacryloyl chloride. Thus one can obtain acrylate and methacrylate terminated polyesters 3. Treatment of phenol terminated polyesters in a suitable solvent with diisocyanates and an appropriate catalyst will cap the polyester with an isocyanate reactive moiety.

Similarly, treatment with 2-isocyanotoethyl methacrylate in the presence of a catalyst such as di-n-butyl tin laurate will cap the polyester with a methacrylate derivative. Treatment of the acid chloride terminated polyesters prepared by condensation of diphenols 1 with excess trans-1,4-cyclohexane dicarboxylic acid chloride with allyl alcohol or glycidyl alcohol results in polyesters 4 that are epoxide and allyl capped, respectively.

Similarly, the acid chloride terminated polyesters can be treated with alkyl and arylalkyl diols, alkyl and arylalkyl diamines, methacryloyl alkanols and acryloyl alkanols to produce polyesters that are hydroxy, amine, methacrylate and acrylate capped, respectively.

To practice this invention as a coating system, the end capped liquid crystal polyester (3 or 4) is mixed with either a photoinitiator or thermal initiator, heated above the melting point, and aligned by shear on the substrate. Crosslinking the reactive end groups is effected using actinic radiation or heat. For instance, photoinitiators such as Irgacure 651 from Ciba Geigy are effective in crosslinking the aligned polyesters 3 and 4 end capped with acrylate or methacrylate groups. Thermal initiators such as benzoyl peroxide are also effective in curing the coating. Other methods not requiring initiators such as electron beam are also useful in producing crosslinked films.

Amine terminated polyesters can be cured in the presence of diepoxides. A typical diepoxide useful in coatings is, for instance, bis phenol A diglycidyl ether.

The advantages and attributes of the present invention will become more apparent from the following examples which are intended to illustrate but not limit the scope of the present invention:

EXAMPLE 1

Diphenol 1a(n=3)

A solution of p-hydroxybenzoic acid (151.8 g, 1.1 mol) in dimethylformamide (330 ml) was heated to 90° C. with mechanical stirring in a one Liter three neck flask. Potassium hydroxide (66 g, 85% KOH, 1.0 mol) was added in 8-10 portions over 5 minutes causing a vigorous exotherm, the temperature rising to 130° C. The mixture was stirred for 5 minutes, followed by addition of 1,1'-oxybis[2-(2-chloroethoxy)ethane](57.75 g, 0.25 mol) all at once. The mixture was heated at 120°–125° C. for 5.5 hours. After cooling to room temperature, the mixture was washed twice with a total of one liter of ether-dichloromethane (4:1). The extract was washed twice with 100 ml portions of cold saturated sodium hydrogen carbonate—1N sodium carbonate (1:1), was washed one time with brine solution, and was dried over magnesium sulphate. Concentration at reduced pressure gave a yellow oil (89.8 g). Chromatography of the oil on silica gel with hexane-ethyl acetate (1:2) gave 61.2 g of colorless oil that was crystallized from ether to give a white solid (50.6 g, 46.7%) mp 59°–61° C. This material had 0.5 equivalents of ether tightly bound to it that was removed by drying at 0.1 mmHg at about 60° C. Analytical sample prepared from ether: mp 61°–64° C.; 1H NMR (CDCl$_3$+5% DMSO d6) 7.9 (doublet, 4H), 7.5 (broad singlet, 2H) 6.85 (doublet, 4H), 4.4 (doublet of doublet, 4H), 3.8 (doublet of doublet, 4H), 3.18 (singlet, 63.6 ppm; IR (CHCl$_3$) 3340, 1710 1611 1595 1515 cm$^{-1}$. Anal. Calcd. for C$_{22}$H$_{26}$O$_9$: C, 60.82; H, 6.03. Found: C, 61.21; H, 6.27.

Representative compounds prepared in a manner similar to Example 1 are illustrated in the following Table 3.

TABLE 3

| X | Tm °C. | Yield % |
|---|---|---|
| CO—O—(CH$_2$CH$_2$O)$_2$—CO | 137–138.5 | 49.5 |
| CO—O—(CH$_2$CH$_2$O)$_3$—CO | 141–143 | 38 |
| CO—O—(CH$_2$CH$_2$O)$_4$—CO | 61–64 | 46.7 |
| CO—O—(CH$_2$CH$_2$O)$_5$—CO | 63.5–66 | 46 |
| OCH$_2$—Si(CH$_3$)$_2$—O—Si(CH$_3$)$_2$—CH$_2$O | 139–141 | 50 |

TABLE 3-continued

| X | Tm °C. | Yield % |
|---|--------|---------|
| O—(CH$_2$CH$_2$O)$_3$ | 106–112 | 20 |

Example 2

Homopolyester 2a based on diphenol 1a

To a solution of diphenol 1a (n=2) (9.35 g, 24 mmol) in anhydrous pyridine (16 ml) was added a solution of trans-1,4-cyclohexane dicarbonyl chloride (4.18 g, 20 mmol) in 1,2-dichloroethane (16 ml) all at once at room temperature. The mixture was heated to reflux for 0.5 hour followed by distillation of most of the 1,2 dichloroethane under reduced pressure. The remaining molten mass was worked with warm water four times and once with methanol. The white granular solid was dried at 50° C. at 15 mmHg overnight to provide polyester 2b (10.8 g, 90%). The optical microscope showed a melting point at 122° C., a clear nematic texture at 135° C., and an isotropic transition at 185° C. There was no evidence of phase separation in the heating cycle. Proton NMR end group analysis indicated a number average molecular weight of 6,800.

Representative polyesters 2a made in a manner similar to Example 2 are shown in the following Table 4.

TABLE 4

| Polyester | n | Mn | Tg | Tm | Tsn | Ti |
|-----------|---|------|-------|-----|-----|-----|
| 2a | | | | | | |
| | 1 | 6000 | 32 | 111 | 124 | 190 |
| | | 11960 | 36 | 122 | 168 | 223 |
| | | 25000 | 53 | 135 | 180 | 241 |
| | 2 | 3400 | 4.6 | 119 | 109 | 153 |
| | | 5200 | 15.4 | 122 | 128 | 180 |
| | | 19560 | 16.2 | 123 | 160 | 201 |
| | 3 | 3600 | −3.5 | 61 | 91 | 110 |
| | | 9900 | −2.5 | 62 | 132 | 149 |
| | | 25000 | 2.9 | 62 | 149 | 163 |
| | 4 | 4000 | −12.3 | 51 | — | 58 |
| | | 7200 | −11.3 | 52 | — | 90 |
| | 1,2 (1:1) | 4000 | 19 | 73 | 90 | 171 |
| | 1,2 (1:1) | 10000 | 21 | 90 | 109 | 194 |

Where:
Tg is the mid-point of the glass transition, in °C.,
Tm is the crystalline melting point, in °C.,
Tsn is the smectic-nematic transition temperature, in °C., and
Ti is the isotropic transition temperature, in °C.

Texture and Vixcometry Studies on Polyesters 2a

All the polyesters 2a formed turbid melts. In general at the crystal-melt transition (Tm), a viscous fluid forms with a non-descript texture. Further heating results in an obvious decrease in viscosity at one point to give a clearly defined nematic texture. This is tentatively assigned to a smectic-nematic transition (Tsn). After annealing or the application of mechanical shear, a homogeneous texture usually forms, indicating a well-aligned nematic texture. At the isotropic point there is a rapid and very uniform loss of birefringence with a very narrow biphasic region. The change in viscosity over this temperature range for polyester 2a was measured using a Brookfield viscometer and results are given in the following Table 5.

TABLE 5

| Temperature °C. | Viscosity cP |
|-----------------|--------------|
| 124 | 93000 |
| 127 | 22500 |
| 128 | 18300 |
| 133 | 11600 |
| 139 | 9300 |
| 144 | 8000 |
| 155 | 6700 |
| 160 | 6300 |
| 165 | 6390 |
| 171 | 7600 |
| 173 | 8300 |
| 177 | 8500 |
| 180 | 7800 |
| 185 | 6700 |
| 190 | 6100 |

Polyester 2a where n=4 did not exhibit a clearly defined nematic phase and showed a broad biphasic region on heating to the isotropic point.

Upon cooling from the isotropic melt most of the polyesters 2a form well-aligned nematic homogeneous textures. A phase transition occurs on further cooling and a typical nematic-smectic domain texture forms. Over a period of minutes to two hours, a fan-like smectic texture usually forms depending upon the molecular weight and annealing temperature. Thus, optical microscopy observations clearly support the existence of two liquid crystal phases; a high temperature nematic phase and a lower temperature smectic phase spanning the whole range of molecular weights for polyesters 2a (n=1 to 3). Polyester 2a (n=4) appears to exhibit only one liquid crystal phase, probably a smectic phase, judging from the batonnets that form upon cooling the isotropic melt.

Example 3

Copolyester 2a (n=1,2) derived from diphenols 1a (n=1) and 1a (n=2)

Copolyesters containing two flexible spacer groups were prepared by condensation of the acid chloride with a 1:1 ratio of diphenols. This example illustrates the synthesis of copolyester 2a (n=1,2). The diphenol 1a (n=2) (46.8 g) and 1a (n=1) (41.5 g) were dissolved in pyridine (160 ml). To this solution, trans-1,4-cyclohexane dicarbonyl chloride (g, 0.2 mol) in 160 ml 1,2-dichloroethane was added in a rapid stream. The solution was heated to 90° C. for 0.5 hour. Excess 1,2-dichloroethane was removed by distillation under vacuum (4 mmHg) and the remaining melt poured into water (800 ml). The water layer was decanted and the molten polymer was washed four times with water and then three times with a water/methanol mixture (1:1). This was repeated to give an off-white solid (102.4g, 88.5% yield). Proton NMR end-group analysis gave a number average molecular weight (Mn) of 4000. Optical microscopy showed a melting point at 75° C. into a smectic texture, a smectic-nematic transition at 93° C., and an isotropic transition at 170° C. Once melted, the copolyester did not recrystallize from the supercooled mesophase melt after annealing at 35° C. for one week. Notable is the broad nematic range of 77° C.

Example 4

This example illustrates the end group capping of polyester 2a with a polymerizable moiety. Triethyl amine (0.11 ml) was added to polyester 2a (1.0 g) dissolved in 15 ml methylene chloride. To this solution was added 0.065 ml acryloyl chloride. The resulting mixture was stirred under nitrogen at 25° C. for 1.75 hours. The mixture was then concentrated to a solid under vacuum and washed with water, methanol, acetone and again with water. The white solid polymer was dried in a vacuum oven at 40° C. to yield 0.9g. Quantitative end group capping of polyester 2a was verified by NMR analysis.

EXAMPLE 5

This example describes the processing necessary to produce an aligned liquid crystalline polyester surface coating. The copolyester 1a (n=1,2) described in Example 3 was acrylate end-capped following the procedure described in Example 4. The copolyester was mixed with 1 wt.% of the photoinitiator (irgacure 651) and heated to 130°-140° C. on a glass substrate. The resultant opaque mobile nematic melt was then drawn down using a 5 mil blade. The coating was cooled to 90° C. Then the coating was exposed to ultra-violet radiation (>300 nm) emitted from a 750 W Xenon arc lamp for 90 seconds under a nitrogen atmosphere. The resultant transparent coating was insoluble in chlorinated solvents and had anistropic mechanical properties as described in the following Table 6.

TABLE 6

| Orientation to Draw Down Direction | Tensile Modulus psi | Elongation to Break % |
|---|---|---|
| Parallel | 4300 | 23 |
| Perpendicular | 1115 | 167 |

The same procedure was used to coat the surface of a polyvinyl chloride based flooring covering.

We claim:

1. A polyester including a chain structure of

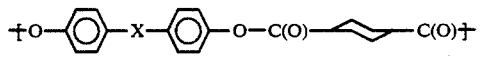

where X is selected from the group consisting of
—C(O)—O—$CH_2CH_2$O—($CH_2CH_2$O)$_n$—C(O)—,
—C(O)—O—$CH_2$—(—Si($CH_3$)$_2$—O—)$_n$—Si($CH_3$)$_2$—$CH_2$—O—C(O)—,
—C(O)—O—$CH_2CH(CH_3)$O—($CH_2CH(CH_3)$O)$_n$—C(O)—,
—O—$CH_2CH_2$O—($CH_2CH_2$O)$_n$—O—,
—O—$CH_2$—(—Si($CH_3$)$_2$—O—)$_n$—Si($CH_3$)$_2$—$CH_2$—O—,
—O—$CH_2CH(CH_3)$O—($CH_2CH(CH_3)$O)$_n$—, and
mixtures thereof; and
where n is 1 to 6.

2. The polyester of claim 1 wherein n is 1 to 4.

3. The polyester of claim 1 wherein the number average molecular weight is from 1,000 to 25,000.

4. The polyester of claim 1 wherein X is selected from the group consisting of
—C(O)—O—$CH_2CH_2$O—($CH_2CH_2$O)$_n$—C(O)—,
—O—$CH_2CH_2$O—($CH_2CH_2$O)$_n$—O—, and
mixtures thereof; and
where n is 1 to 6.

5. The polyester of claim 4 wherein the number average molecular weight is from 1,000 to 25,000.

6. The polyester of claim 1 having a structure selected from the group consisting of

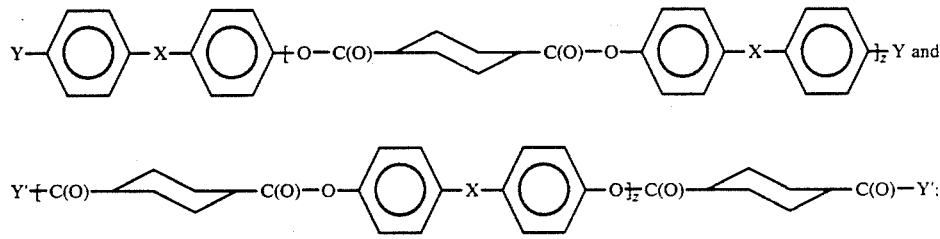

where
X and n are as defined in claim 1;
Y is independently selected from the group consisting of
HO—
$CH_2$=CH—C(O)—O—,
$CH_2$=C($CH_3$)—C(O)—O—,
$CH_2$=CH—$CH_2$—O—,
$CH_2$=C($CH_3$)—C(O)—O$CH_2CH_2$N—C(O)—O—,

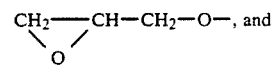

O—C=N—$R_1$—N(H)—C(O)—O—;
Y' is independently selected from the group consisting of
HO—,
$CH_2$=CH—$CH_2$—O—,

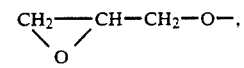

HO—$R_1$—O—,
$NH_2$—$R_1$—$NR_2$—,
$R_2$—C(=$CH_2$)—C(O)—O—$R_1$—O—, and
Cl—;
$R_1$ is selected from the group consisting of
$C_2$ to $C_{20}$ alkyl,
$C_2$ to $C_{20}$ arylalkyl, and
$C_2$ to $C_{20}$ cycloalkyl;
$R_2$ is selected from the group consisting of
H—, and
$C_1$ to $C_4$ alkyl; and
z is 1 to 50.

7. The polyester of claim 6 wherein n is 1 to 4.

8. The polyester of claim 6 wherein z is 1 to 5.

9. A coating composition comprising the polyester of claim 6.

10. A floor covering comprising the polyester of claim 6.

11. A polyester comprising a cyclohexane ring in the backbone, the polyester being thermotropic and nematic, and having a crystalline melting point less than 125°.

12. The polyester of claim 11 wherein the crystalline melting point less than 100° C.

13. The polyester of claim 11 wherein the solubility in halogenated solvent greater than 10 wt. %.

14. The polyester of claim 11 wherein the number average molecular weight is from 1,000 to 25,000.

15. The polyester of claim 11 wherein the nematic range is at least 40° C.

16. The polyester of claim 11 wherein the polyester is a homopolymer.

17. The polyester of claim 11 wherein the polyester includes a chiral moiety.

* * * * *